United States Patent [19]

Nahara et al.

[11] 4,237,468
[45] Dec. 2, 1980

[54] RECORDING MEMBER

[75] Inventors: Akira Nahara; Minoru Wada; Yuzo Mizobuchi; Tomoaki Ikeda, all of Asaka, Japan

[73] Assignee: Fuji Photo Film Co., Ltd., Minami-ashigara, Japan

[21] Appl. No.: 862,883

[22] Filed: Dec. 21, 1977

[30] Foreign Application Priority Data

Dec. 29, 1976 [JP] Japan ................................ 51-158464

[51] Int. Cl.³ ............................................. G01D 15/34
[52] U.S. Cl. .................................................. 346/135.1
[58] Field of Search ............................ 346/135.1, 76 L

[56] References Cited

U.S. PATENT DOCUMENTS

| | | | |
|---|---|---|---|
| 3,526,542 | 9/1970 | Wiese, Jr. et al. | 346/135 UX |
| 3,889,272 | 6/1975 | Lou et al. | 346/135 X |
| 3,959,799 | 5/1976 | Gambino et al. | 346/135 |
| 4,000,492 | 12/1976 | Willens | 346/135 X |
| 4,069,487 | 1/1978 | Kasai et al. | 346/135 X |
| 4,188,214 | 2/1980 | Kido et al. | 346/135.1 |

Primary Examiner—George H. Miller, Jr.
Attorney, Agent, or Firm—Sughrue, Rothwell, Mion, Zinn and Macpeak

[57] ABSTRACT

A mono- or multi- layer recording member, suitable for recording using e.g., a laser, comprising a support having a recording layer thereon wherein the recording layer contains (a) a metal selected from the group consisting of Sn, Bi and In and (b) a halide capable of being thermally or photo-chemically activated by high energy density light irradiation and which thereby can promote a thermally initiated phase or structure change of the metal (a).

13 Claims, 7 Drawing Figures

RECORDING MEMBER

BACKGROUND OF THE INVENTION

1. Field of the Invention

This invention relates to recording members for information recording by means of high energy density light beams, such as a laser light beam.

2. Description of the Prior Art

In addition to light-sensitive members such as those based on silver salts, recording members in which information is recorded using high energy density beams e.g., of an energy sufficient to thermally deform, such as a laser, include heat-sensitive recording members as described below. Heat-sensitive members for recording using high energy density light beams have a recording layer with a high optical density for the high energy density light beam to be used. When the beam impinges onto such a recording layer, a localized increase in temperature takes place to cause thermally initiated phase changes or thermally initiated structure changes such as melting, vaporization, aggregation, etc. to occur. Such changes lead to a removal of the recording layer at the irradiated area, which gives rise to an optical density difference between the irradiated area and the non-irradiated area to record information. Such types of heat-sensitive recording members have various advantages such as the elimination of additional processings such as development, fixation, etc., the elimination of the necessity for use of a dark room due to lack of sensitivity to normal room illumination, the capability of forming an extremely high contrast image, the ability to subsequently record additional information, i.e., add-on capability, etc.

In most of the cases where information is recorded onto such heat-sensitive members, the information to be recorded is usually converted into the form of an electrical, time-sequential signal, depending on how the intensity of the laser beam is modulated. The recording member is scanned with the modulated beam whereby a permanent image is obtained simultaneously with the recording, in other words, a real time recording is accomplished.

The recording layer for such heat-sensitive recording members can generally comprise inexpensive materials including metals, dyes, plastics, etc. Such recording members are described, for example, in the proceedings of the 11th *Symposium on Electron, Ion & Laser Beam Technology* edited by M. L. Lenene et. al. (1969), *Electronics* p.50 (1968), D. Maydan *The Bell System Technical Journal*, Vol.50 p.1761 (1971), C.O. Carlson *Science*, Vol.154 p.1550 (1966), etc. Metal based recording layers, consisting of a thin coating of Bi, Sn, In, etc., are prominent as heat-sensitive recording member due to their high resolving power as well as the extremely high contrast of the recorded image. However, many such recording members cannot efficiently make use of laser energy due to a loss caused by a relatively large surface reflectance, which often exceeds 50%, of the recording member. This inevitably leads to an increase in the recording energy of the light beam. Therefore, to ensure a high scanning rate in recording, a very high power laser source is required. As a result, the overall recording apparatus becomes bulky and expensive. As a matter of course, recording members with higher recording sensitivity have been investigated. One example described in U.S. Pat. No. 3,560,994 utilizes a multi-layer structure comprising Se, Bi and Ge. In this structure, the light reflectance of the thin coating comprising Se and Bi is reduced by overlaying a very thin coating of Ge on the Se and Bi layer. Two drawbacks are evident in this approach; one is the use of Se which is toxic, and the other is the poor quality of the recorded images.

Japanese Patent Application (OPI) 74632/1976 describes recording members of another type provided with a reflection preventing layer on the metal recording coating, this reflection preventing layer exhibiting an intense absorption at the wavelength of the laser light used for recording. Such a reflection preventing layer, however, cannot eliminate reflection completely. Even if one could succeed in a complete elimination of surface reflection, still a high power source for the laser is required to cause phase or structure changes such as melting, evaporation, aggregation, etc. in a thin metal layer. Therefore, recording members with a much higher recording sensitivity have been desired for a long time.

SUMMARY OF THE INVENTION

Therefore, an object of the invention is to provide recording members with a high sensitivity for use in recording using high energy density light beams such as a laser.

Another object of the present invention is to provide highly sensitive recording members which provide superior quality images.

In accordance with the present invention, a highly sensitive recording member is provided comprising a support having thereon a recording layer, which contains (a) at least one metal selected from the group consisting of Sn, Bi and In (hereinafter "metal") and (b) at least one halide compound (hereinafter "halide") capable of being activated thermally or photochemically by light irradiation and capable of promoting the melting, the evaporation or the aggregation of the metal (a).

DETAILED DESCRIPTION OF THE INVENTION

Figure 1:
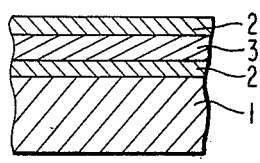
FIGS. 1 to 7 all illustrate cross-sectional views of recording members of the present invention. Throughout all figures, common reference numbers are used to designate the same components.

The high speed recording member of the present invention can have a multi-layer configuration in which each layer comprises either the metal (a) or the halide (b), or a single-layer structure in which both of the metal (a) and the halide (b), as essential components, are present on a support.

Another preferred configuration of the high speed recording member of the present invention comprises a protective coating, comprising an inorganic or organic material, provided on either of the multi- or single-layer structure embodiment described above.

Suitable materials which can be used in the present invention may be any supports generally used in conventional recording materials, including synthetic resin films such as those of polyesters such as poly(ethylene terephthalate), cellulose esters such as cellulose triacetate, acrylic resins, etc., glass, metal plates such as copper plates or aluminum plates or metal foils such as an aluminum foil, etc.

The metals (a) used for the present invention are Sn, In, or Bi. At least one of these metals or a combination of these metals is used. It is significant in selecting these metals for the present invention that one obtains low toxicity, low energy requirements for melting or evaporation, low light reflectance, performance stability during storage such as a lack of variation in the optical density of the recorded image, thermally initiated phase or structure changes, stimulated by thermal or photochemical activation of the halide used such as melting, evaporation, aggregation, etc., which take place easily, thin coating fabrication feasibility etc. Of these metals, Sn is particularly preferred since Sn has high performance stability and is inexpensive.

These metals may be used in a pure form to produce any one of the layer structures which will be described in greater detail hereinafter, or may be used in the form of an alloy.

Layers of these metals can be formed on the support using vacuum evaporation, sputtering, ion plating, electroplating, non-electrolytic plating, etc., using a metal or metals or a metal alloy as the source.

Methods for forming a layer containing two or more metals include vacuum evaporation of an alloy, and simultaneous or sequential deposition of the component metals from separate evaporation sources.

The thickness of the metal layer is determined so as to provide an optical density sufficient for the purpose concerned. For example, to obtain a transmission optical density of about 2, a thickness of from about 300 to about 1500 Å is usually required, though the thickness required depends on the specific metal to some extent. For a reflection density of about 2, a suitable thickness of the layer is about one half of the thickness of the layer described above providing a transmission density of about 2. For most uses, a suitable transmission optical density in general is about 1.3 or higher for use as a microfilm and about 3.0 or higher for use as a lithographic film and a suitable reflection optical density in general is about 2.0 to about 2.4 or higher.

It should further be noted that the necessary thickness will vary depending on the kind of support, the evaporation conditions such as the temperature, the degree of vacuum, the evaporation rate, etc., employed since the structure of the metal layer changes according to these conditions where the metal layer is formed by vacuum evaporation, sputtering, ion plating, etc.

Suitable halides (b) which can be used in the present invention include metal iodides such as $ZnI_2$, $SbI_3$, $SbI_5$, $CdI_2$, $KI$, $AgI$, $ZrI_4$, $SnI_2$, $SnI_4$, $SrI_2$, $CsI$, $TlI$, $WI_2$, $TiI_4$, $CuI$, $ThI_4$, $PbI_2$, $BiI_3$, etc., metal bromides such as $SbBr_3$, $AgBr$, $SnBr_2$, $CsBr$, $TlBr$, $CuBr$, $NaBr$, $PbBr_2$, $NbBr_5$, $BaBr_2$, etc. and metal chlorides such as $CdCl_2$, $KCl$, $AgCl$, $SnCl_2$, $TlCl$, $FeCl_3$, $TaCl_5$, $CuCl$, $NaCl$, $PbCl_2$, $NdCl_3$, $BaCl_2$, etc. One or more of these halides can be used in the present invention.

Particularly suitable halides (b) of those described above are halides which have low toxicity, readily undergo a thermal or photochemical activation such as phase change, decomposition, photo-reduction, etc., exhibit a low tendency toward a deterioration in performance during storage due to the hygroscopic or deliquescent nature thereof or toward a dark reaction with the metal used, and are easily fabricated in the form of film. While not desiring to be bound, the halide (b) used in the present invention apparently promotes phase or structure changes of the metal with which it is used in combination, such as melting, evaporation, aggregation, etc. by activation thermally or photochemically only when the halide is irradiated with a high energy light beam. Although the halide layer accordingly does not act simply as a reflection preventing layer, it is self-evident that the light reflectance of the layer desirably should be as small as possible from the standpoint of the effective use of the light energy.

The most preferred halides (b) for use in the present invention are $AgI$, $AgBr$, $AgCl$, $PbI_2$, $PbCl_2$, $SnI_2$, $SnCl_2$, $CuI$, $CuBr$, and $CuCl$. From a practical point of view, $PbI_2$ is most preferred since it has the least tendency toward a deterioration in performance during storage due to hygroscopicity or deliquescence or due to a dark reaction with the metal (a) used, and can be easily fabricated into a thin film.

Each of these halides can be incorporated in either of the various layer structures described hereinafter individually or as mixtures thereof. These halides can be provided on the support using methods as described above for the formation of the metal layer. One can form a separate halide layer or a layer comprising a mixture of a metal and a halide.

The thickness of the halide layer is adjusted so that the above described metal most readily undergoes a thermally-initiated phase or structure change, such as melting, evaporation, aggregation, etc. upon irradiation with a high energy density light beam. The optimum thickness for the halide layer lies between about 50 and about 1000 Å depending on the kind of the metal used and also on the metal layer thickness.

In accordance with the present invention, the recording layer comprising the metal (a) and the halide (b) provided on a support can have various configurations.

The recording member prepared in accordance with the present invention may have a multi-layer configuration comprising two or more layers, or also a layer of a mixture of the metal and the halide may be used. Furthermore, combinations of a layer of a mixture of the metal and the halide with an additional metal or halide layer are also suitable.

The thickness of a layer comprising a mixture of the metal and the halide should be sufficient to provide the necessary optical density which depends on the kind of the metal and the kind of the halide used and the ratio of the metal to the halide. In order to obtain a transmission density of 2 with a metal to halide weight ratio of 7:3, the mixed layer should have a thickness of about 400 to about 2000 Å. Suitable weight ratios between the metal and the halide, which depend on the combination of the compounds and the thickness of the mixed layer, usually range between about 10:1 and about 1:1.

Formation of the mixed layer comprising the metal and the halide on the support can be achieved by vacuum evaporation, sputtering, ion plating, etc. For example, the metal and the halide can be simultaneously vacuum evaporated onto the support from respective evaporation sources. By controlling the temperature and the charge of each evaporation source, the evaporation rate of the two materials can be controlled separately, thus providing on the support a mixed layer with an arbitrary mixing ratio between the metal and the halide.

In a preferred embodiment of the present invention, a protective surface coating provided on the recording layer comprising a metal and a halide is quite effective in improving the durability, the mechanical strength and the storage stability of the resulting recording member. Such a protective coating which may be a coating of an inorganic or an organic material must be transparent to the high energy density light beam used for recording, mechanically durable, inert to the underlying recording layer, and have a good film-forming capability as well as production feasibility, etc.

Inorganic materials suitable for use as a protective coating in the present invention include $Al_2O_3$, $SiO_2$, SiO, MgO, ZnO, $MgF_2$, $CuF_2$ and similarly transparent compounds. A thin layer of these materials can be produced by vacuum-evaporation or by deposition such as sputtering and ion plating.

Suitable organic materials which can provide superior protective coatings include styrene-containing polymers such as polystyrene, styrene-maleic anhydride copolymers, etc., polymers of vinyl acetate derivatives such as poly(vinyl acetate), poly(vinyl alcohol), poly(vinyl butyral), poly(vinyl formal), etc., methacrylate polymers such as poly(isobutyl methacrylate), poly(methyl methacrylate), etc., acrylamide polymers such as poly(diacetoneacrylamide), poly(acrylamide), etc., cellulose derivatives such as ethyl cellulose, cellulose acetate butyrate, cellulose nitrate, cellulose diacetate, etc., poly(vinyl chloride), halogenated polyolefins such as chlorinated polyethylene, phenolformaldehyde resins, solvent soluble polyester resins, solvent soluble polyamide resins, gelatin, etc. These polymeric materials can be dissolved in a variety of solvents and the resultant solutions can be coated using any of the conventional coating methods well known in the art.

Suitable solvent which can be used from which an appropriate solvent or a combination thereof can be selected, considering the solubility of the polymer used, include acetone, methyl ethyl ketone, methyl isobutyl ketone, methyl Cellosolve, ethyl Cellosolve, butyl Cellosolve, methyl Cellosolve acetate, ethyl Cellosolve acetate, butyl Cellosolve acetate, hexane, cyclohexane, ethylene dichloride, methylene dichloride, benzene, chlorobenzene, methanol, ethanol, butanol, petroleum ether, dimethylformamide, lacquer thinner, etc.

The protective surface coating based on such a synthetic resin material can contain various additives such as pigments, surface matting agents, plasticizers, lubricating agents, etc., depending on the requirements for the end-use concerned. In particular, addition of a higher aliphatic carboxylic acid or acid amide having 11 or more carbon atoms in an amount of about 0.1 to about 10% by weight is highly effective to improve the surface strength of the resultant recording member.

Alternatively, a lubricating agent such as higher fatty acid or acid amide can be provided as a separate coating overlying the protective coating using any of the ordinary coating methods so as to have a dried thickness of from about 0.001 to about 1 micron. The thickness of the protective coating is determined by considerations of the surface strength, storage stability, recording sensitivity, etc., required in the individual applications. A particularly suitable thickness of the protective coating is about 0.01 to about 5 microns.

The recording member prepared in accordance with the present invention comprising a support and a recording layer containing a metal and a halide can have a variety of layer structures, which are illustrated in the accompanying drawings. Turning now to the drawings, each structure is explained below.

FIG. 1 shows the structure of the most typical recording member according to the present invention where halide layers 2 are provided on support 1 with an intervening metal layer 3.

Figure 2:
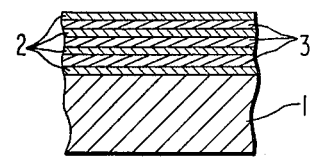

FIG. 2 depicts another structure in which a plurality of each of metal layer 3 and of halide layer 2 are superimposed to form a multi-layer configuration.

Figure 3:
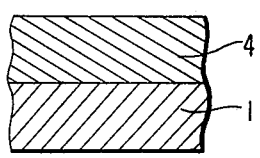

FIG. 3 illustrates a structure in which a layer 4 comprising a mixture of a metal and a halide is provided on support 1.

Figure 4:
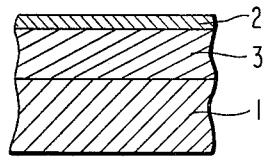

FIG. 4 illustrates the simple structure in which only a single metal layer 3 and a single halide layer 2 are provided on support 1.

Figure 5:
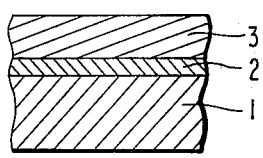

To use the member shown in FIG. 4 for recording light irradiation is ordinarily carried out from the coated side of the member. If it is desired to expose the recording layer through the support, another configuration depicted in FIG. 5 is much preferred.

Figure 6:
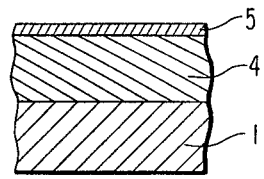
Figure 7:
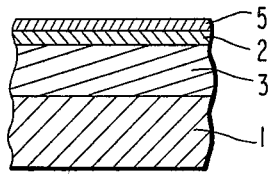

Further, FIGS. 6 and 7 illustrate other layer configurations each of which corresponds to a preferred embodiment using an additional protective surface coating 5 for the structure shown in FIGS. 3 and 4, respectively.

Accordingly the present invention provides recording members for high energy density light beams which have a high recording sensitivity, which can provide a high quality image, and which are free from pollution problems. Suitable sources of irradiation providing a high energy density include radiation such as that of a laser, an electric flash lamp, a mercury lamp whose brightness is increased by condensing the radiation, etc., in addition to a laser beam.

The recording member of this invention can be employed in systems described in U.S. Pat. Nos. 3,911,444, 4,000,334 and 4,000,492.

The present invention is described more specifically by reference to the following examples. Unless otherwise indicated, all parts, percents, ratios and the like are by weight.

EXAMPLE 1

By using a 100 micron thick poly(ethylene terephthalate) film support the layer structure depicted in FIG. 4 was prepared by vacuum evaporation of Sn and one of the various halides shown in Table 1 below, sequentially, with a degree of vacuum of $5 \times 10^{-5}$ Torr. 17 samples were prepared. The Sn layer was 350 Å thick and the halide layer was 200–400 Å thick whereby the transmission optical density fell within the range of from 1 to 2.

Each of these samples was subjected to a scanning exposure with an argon laser beam (wavelength 5145 Å) with a maximum output energy of 2 W which was condensed by a lens system to a spot of a diameter of about 25 microns. The scanning speed was 19 m/sec. Recording was made from the top coated side of the member. To evaluate the recording sensitivity on a relative scale, the intensity of the laser at the recording member surface was varied, and the value at which a 10 micron-diameter spot was formed on the recording layer was taken as a measure of the speed. The results are shown in Table 1 below together with the halide compositions, and the layer thicknesses.

TABLE 1

| Sample No. | Metal Layer Composition | Thickness (Å) | Halide Layer Composition | Thickness (Å) | Laser Output Intensity Required for Recording (mW) |
|---|---|---|---|---|---|
| 1 | Sn | 350 | None | — | 350 |
| 2 | " | " | $PbI_2$ | 200 | 100 |
| 3 | " | " | CuI | 300 | 100 |

TABLE 1-continued

| Sample No. | Metal Layer Composition | Thickness (Å) | Halide Layer Composition | Thickness (Å) | Laser Output Intensity Required for Recording (mW) |
|---|---|---|---|---|---|
| 4 | " | " | AgI | 350 | 100 |
| 5 | " | " | SnI$_2$ | 200 | 100 |
| 6 | " | " | CsI | 350 | 225 |
| 7 | " | " | KI | 400 | 175 |
| 8 | " | " | PbCl$_2$ | 350 | 150 |
| 9 | " | " | AgCl | 300 | 100 |
| 10 | " | " | CdCl$_2$ | 300 | 200 |
| 11 | " | " | SnCl$_2$ | 400 | 100 |
| 12 | " | " | CuCl | 350 | 150 |
| 13 | " | " | FeCl$_3$ | 300 | 250 |
| 14 | " | " | AgBr | 400 | 75 |
| 15 | " | " | CuBr | 300 | 125 |
| 16 | " | " | PbBr$_2$ | 300 | 200 |
| 17 | " | " | KCl | 300 | 175 |

As is evident from the results in Table 1 above, the recording members with the halide as described above exhibited recording speeds which were about 2–4 times faster than that where the metal (Sn) layer alone was used.

In general, heat-sensitive recording materials require less total energy when a higher intensity energy is applied for a short period than when low intensity energy is applied for a longer duration. In other words, heat sensitive recording members exhibit a so-called reciprocity law failure. The minimum energy requirement in the present example was measured by changing the intensity of the laser beam keeping the spot size and the scanning rate constant. The recording sensitivity can also be compared by changing the scanning rate with a constant beam intensity and a constant beam spot size.

Using the latter method of measurement, it is clear that the effect of a halide layer on the recording sensitivity will be expressed by a factor much greater than the above value of 2–4 times obtained using the former method. For example, when the sensitivities of Samples No. 1 and 2 were compared by scanning with a 350 mW output intensity, 25 micron diameter spot laser beam using various scanning rates, Sample No. 2 was found to be more than 8 times more sensitive than Sample No. 1.

Further, the recording members provided with a halide layer exhibited higher sensitivities than those without the halide layer even when the irradiation with the laser beam was through the support.

The relative recording sensitivity in the following examples was measured using the same method as described in this example and expressed by the minimum output laser intensity required for recording.

EXAMPLE 2

A series of samples was prepared by superimposing a metal layer of various kinds and a PbI$_2$ (as the halide) layer using procedures as described in Example 1. The relative sensitivity of each sample was determined using the same method as described in Example 1.

The results obtained are summarized in Table 2 below.

TABLE 2

| Sample No. | Metal Layer Composition | Thickness (Å) | Halide Layer Composition | Thickness (Å) | Laser Output Intensity Required for Recording (mW) |
|---|---|---|---|---|---|
| 1* | Sn | 350 | None | — | 350 |
| 2** | " | " | PbI$_2$ | 200 | 100 |
| 3* | Bi | 300 | None | — | 200 |
| 4** | " | " | PbI$_2$ | 200 | 125 |
| 5* | In | 300 | None | — | 1050 |
| 6** | " | " | PbI$_2$ | 200 | 100 |
| Comparsion 7 | Al | 300 | None | — | More than 2000 |
| 8 | " | " | PbI$_2$ | 200 | 250 |
| 9 | Te | 300 | None | — | 200 |
| 10 | " | " | PbI$_2$ | 200 | 150 |

*Control
**Invention

The results in Table 2 above show that PbI$_2$ containing recording members are superior to those comprising solely a metal layer or using metals outside the scope of this invention in terms of recording speed. With appropriate combinations of layer composition, about a ten times increase in sensitivity is achieved. Similar improvements of speed were always observed for other combinations, which are not shown in Table 2 above, using Sn, In and/or Bi, etc. with various halides including PbI$_2$.

EXAMPLE 3

The structure shown in FIG. 3 was prepared with a 100 micron thick poly(ethylene terephthalate) film support by vacuum-evaporating either of Sn or Bi and PbI$_2$ under a degree of vacuum of $5 \times 10^{-5}$ Torr. The mixed layer containing the metal and PbI$_2$ was produced by utilizing two evaporation sources for the two components (metal-Sn or Bi; halide-PbI$_2$), each of which was regulated to evaporate the component at the desired rate. The thickness of the mixed layer was set at 550 Å so that a transmission optical density of 1–2 was obtained. The mixing ratio of the metal and PbI$_2$ was 7:3 by weight.

Distinct from the recording films of a multi-layer structure described in the preceding examples, the recording member thus prepared did not exhibit any interference color. The relative sensitivity of the member was evaluated using the method described in Example 1. An output laser intensity of 100–125 mW was quite sufficient for recording on either of the Sn/PbI$_2$ mixture layer or of the Bi/PbI$_2$ mixture layer.

The recording sensitivity proved to be substantially unchanged for top-side and through-support exposure. In comparison to the case where only a pure metal layer was used, the halide containing metal layer exhibited a faster recording sensitivity by a factor of 2 to 4.

Another sample was prepared by forming an additional 200 Å thick coating of PbI$_2$ on the mixed layer prepared above. Again, 100 mW of recording energy was quite sufficient for recording using this modified sample.

EXAMPLE 4

Onto the same support material as described in Example 1, either of Sn or Bi and PbI$_2$ was vacuum-evaporated under a degree of vacuum of $5 \times 10^{-5}$ Torr to form the structure illustrated in FIG. 1. The thickness of the three layers, i.e., the PbI$_2$ layer contiguous to the support, the intermediate metal layer and the top PbI$_2$ layer, were controlled at 50, 350 and 150 Å, respectively. The relative recording speed was evaluated using the method described in Example 1. Regardless of the kind of metal (Sn or Bi) used, an output laser intensity of 100–125 mW was sufficient for recording information.

Further, in the case of a recording material having 50 Å thick PbI$_2$ layers and 200 Å thick metal (Sn or Bi) layers as illustrated in FIG. 2 prepared in the same manner as above an output laser intensity of 100 to 125 mW was sufficient for recording information as well.

EXAMPLE 5

The procedure described in Example 1 were repeated to produce a recording member of the type shown in FIG. 5 by depositing PbI$_2$ in a 200 Å thickness and a metal (Sn or Bi) in a 350 Å thickness in turn on the support. The sensitivity evaluation was conducted using the method described in Example 1, giving a value of 100–125 mW for exposure through the support. Further, the sensitivity was also higher than the member without the PbI$_2$ coating for exposure from the top surface with a laser.

EXAMPLE 6

Onto the same support as was described in Example 1 were deposited three components, i.e., Bi, Sn and PbI$_2$, in this order under a vacuum of $5 \times 10^{-5}$ Torr. The results of relative sensitivity evaluation carried out in accordance with the method described in Example 1 are shown in Table 3 below.

TABLE 3

| Sample No. | Layer Thickness | | | Transmission Optical Density | Laser Output Energy Required for Recording (mW) |
|---|---|---|---|---|---|
| | Bi (Å) | Sn (Å) | PbI$_2$ (Å) | | |
| 1 | 50 | 700 | None | 2.4 | 500 |
| 2 | 50 | 700 | 200 | 2.6 | 125 |
| 3 | 50 | 1000 | None | 3.9 | 600 |
| 4 | 50 | 1000 | 200 | 4.1 | 200 |

The results shown in Table 3 above clearly demonstrate that even when the metal layer thickness is sufficiently large to give a transmission optical density higher than 2, the use of a halide layer can still improve the sensitivity of the recording material.

It should be noted that in general for applications in which a high transmission optical density is required an extremely high output laser energy must inevitably be used for a recording member consisting of a single metal layer. According to the present invention, a marked reduction in output intensity is achieved for such an application.

EXAMPLE 7

Samples were prepared as described in Example 1, and on the top of each a solution comprising 1 g of chlorinated polyethylene (available from San-yo Kokusaku Pulp Ind. under the trade name "LPA"), 0.12 g of triphenyl phosphate and 30 mg of stearylamide dissolved in 100 g of toluene was overcoated to produce a thickness of about 0.2 micron. Further, on this overcoating was again coated a solution comprising 1 g of stearic acid and 0.3 g of behenic acid dissolved in 100 g of n-hexane in a thickness of about 0.02 micron. These coatings behaved as a protective layer. The relative sensitivity of the resultant recording films was evaluated according to the method described in Example 1. The evaluation showed that the minimum laser intensity listed in Table 1 was increased only by 25–50 mW, and that hence the speed was still higher than for the sample using the metal layer alone. Moreover, the use of such a protective coating greatly contributed to the improvement of surface film strength.

Similar minimum laser intensity increments were observed (i.e., by 25–50 mW) when the same protective coating as described above was provided on each of the recording members described in Examples 2 to 6. This means that these overcoated recording members are still more sensitive than the corresponding member using the metal layer alone.

Close observation of the recorded tracks on the recording films prepared in accordance with the present invention using a scanning electron microscope showed that the portion where the laser beam spot had impinged was perfectly eliminated or that the material of that portion aggregated at the periphery of the recorded spot in the form of minute particles. This fact appears to be the basis of the high contrast and of the high image quality achieved with the recording members of the present invention.

While the invention has been described in detail and with reference to specific embodiments thereof, it will be apparent to one skilled in the art that various changes and modifications can be made therein without departing from the spirit and scope thereof.

What is claimed is:

1. A recording member comprising a support having a recording layer thereon wherein the recording layer contains (a) a metal selected from the group consisting of Sn, Bi and In and (b) a halide capable of being thermally or photo-chemically activated by high energy density light irradiation and which thereby promotes a thermally initiated phase or structure change of the metal (a), wherein said halide (b) is selected from the group consisting of ZnI$_2$, SbI$_3$, SbI$_5$, CdI$_2$, KI, AgI, ZrI, SnI$_2$, SnI$_4$, SrI$_2$, CsI, TiI, WI$_2$, TiI$_4$, CuI, ThI$_4$, PbI$_2$, BiI$_3$, SbBr$_3$, AgBr, SnBr$_2$, CsBr, TiBr, CuBr, NaBr, PbBr$_2$, NbBr, BaBr$_2$, CdCl$_2$, KCl, AgCl, SnCl$_2$, TlCl, FeCl$_3$, TaCl$_5$, CuCl, NaCl, PbCl$_2$, NdCl$_3$, BaCl$_2$, and a mixture thereof.

2. The recording member according to claim 1, wherein said halide (b) is selected from the group consisting of AgI, PbI$_2$, SnI$_2$, CuI, AgBr, CuBr, AgCl, PbCl$_2$, SnCl$_2$ and CuCl.

3. The recording member according to claim 1, wherein said halide (b) is PbI$_2$.

4. The recording member according to claim 1, wherein said recording layer comprises a layer of said metal (a), a layer of said halide (b) and a third layer containing a mixture of (a) a metal and (b) a halide.

5. The recording member according to claim 1, including a protective coating layer on said recording layer.

6. The recording member according to claim 1, wherein said metal is Sn.

7. The recording member of claim 1, wherein said phase or structure change of the metal (a) is a melting, evaporation or aggregation.

8. The recording member according to claim 1, wherein said recording layer comprises a layer of the metal (a) and a layer of the halide (b).

9. The recording member according to claim 8, wherein said layer of said halide (b) has a thickness of from about 50 to about 1000 Å.

10. The recording member according to claim 8, which consists of essentially a layer of the metal (a) and a layer of the halide (b).

11. The recording member according to claim 1, wherein said recording layer comprises a layer of a mixture of said metal (a) and said halide (b).

12. The recording member according to claim 11, wherein the weight ratio of said metal (a) to said halide (b) ranges from about 10:1 to about 1:1.

13. The recording member according to claim 11, wherein said recording layer consists essentially of a layer of a mixture said metal (a) and said halide (b).

* * * * *

UNITED STATES PATENT AND TRADEMARK OFFICE
CERTIFICATE OF CORRECTION

PATENT NO. : 4,237,468
DATED : December 2, 1980
INVENTOR(S) : AKIRA NAHARA ET AL It is certified that error appears in the above—identified patent and that said Letters Patent is hereby corrected as shown below:

Col. 10, Claim 1, line 42, delete "ZrI" and insert therefor -- $ZrI_4$ --.

Col. 10, Claim 1, line 42, delete "TiI" and insert therefor -- $T\ell I$ --.

Col. 10, Claim 1, line 43, delete "TiBr" and insert therefor -- $T\ell Br$ --.

Signed and Sealed this

Fifth Day of May 1981

[SEAL]

*Attest:*

RENE D. TEGTMEYER

*Attesting Officer*     *Acting Commissioner of Patents and Trademarks*